United States Patent [19]
Bauer et al.

[11] 3,896,847
[45] July 29, 1975

[54] LAMELLAR VALVES

[75] Inventors: Friedrich Bauer; Hans Hrabal, both of Vienna, Austria

[73] Assignee: Hoerbiger Ventilwerke Aktiengesellschaft, Vienna, Austria

[22] Filed: Dec. 17, 1973

[21] Appl. No.: 425,349

[30] Foreign Application Priority Data
Dec. 22, 1972 Austria ............................ 10971/72

[52] U.S. Cl. .......................................... 137/512.15
[51] Int. Cl.² ......................................... F16K 15/16
[58] Field of Search ...................... 137/512.15, 512.4

[56] References Cited
UNITED STATES PATENTS
2,798,505  7/1957  Kehler ...................... 137/512.15 X
3,823,735  7/1974  Frenkel .......................... 137/512.15

FOREIGN PATENTS OR APPLICATIONS
823,184  11/1959  United Kingdom............ 137/512.15

Primary Examiner—Robert G. Nilson
Attorney, Agent, or Firm—Watson, Cole, Grindle & Watson

[57] ABSTRACT

A lamellar valve has a closure plate consisting of elastic tongues with free ends, the tongues being interconnected at the opposite ends by a transverse web. Opposite ends of the web are carried by guide strips clamped to the valve seating plate at points spaced from the transverse web.

4 Claims, 4 Drawing Figures

LAMELLAR VALVES

This invention relates to a lamellar valve, in particular for compressors, having a seating plate with through-flow channels covered by a closure plate carried substantially free of friction by flexible guides.

Conventional lamellar valves are valve structures in which the through-flow channels of the seating plate are covered by normally linearly extending tongues or lamellae. The actual lamellae consist of separate tongues which are clamped at one end, their other end projecting over the associated passage channels of the seating plate. In this connection it is also conventional to join together several lamellar or tongues by a transverse joining web to form a continuous closure plate which is fixedly clamped on to the seating plate in the area of the joining web. Lamellar valves have the advantage in relation to plate valves, which are usually annular, that they are comparatively simple and the separate tongues can be moved independently of one another, with the result that it is possible to have a substantially elastic operation of the valve. A disadvantage however is that with an open valve the stroke gap given by the tongues decreases from the free end of the tongue to the clamping point, with the result that with the same passage area of the seating plate the throughflow cross-section of such valves is smaller than with plate valves in which closure plates lift from the seating plate in parallel relation to the seating plate.

There is also a known valve structure designated as a lamellar valve in which the lamellae are joined together to form a continuous closure plate carried substantially without friction by guide rods. This closure plate is of rectangular, or approximately rectangular, cross-section and is provided with linearly running slits so that for covering the passage channels strips occur which run parallel to one another and which are connected at both ends to adjacent strips. The flexible guide rods engage on two sides of the closure plate and are constructed either linearly or as U-shaped double guide rods. The connected together strips in this arrangement as with plate valves rise up simultaneously from the seating plate over their entire length and move parallel to the plate, so that when the valve is open the entire stroke space is freed. The advantages of the actual lamellar valves, in particular the free movability of the individual lamellae or tongues independently of the other lamellae or tongues, are substantially lost with such an arrangement, however.

The present invention provides a lamellar valve, in particular for compressors, having a seating plate with throughflow channels covered by a closure plate carried by flexible guide rods. The closure plate consists of tongues with free ends, the tongues being connected by a transverse joining web and the flexible guide rods extend from the ends of the joining web and are clamped at locations spaced from the joining web.

With this arrangement upon opening of the valve the tongues, independently of one another, can move away from the seating plate unhindered. The flexible guide rods however at the same time also allow lifting of the joining web from the seating plate so that when the valve is open a correspondingly increased passage cross-section is freed. Moreover, smooth working of the valve is achieved thereby, so that hard strokes of the closure plate on the end stops are avoided, on the opening of the valve — i.e. on a catcher plate, and on the seating plate on the closing of the valve.

Preferably a stroke limiting abutment is provided for the joining web at a smaller distance from the seating plate than the end abutment for the free ends of the elastic tongues. As a result, the bending stresses of the flexible guide rods and of the elastic tongues are reduced. By suitably selecting the spacing of the stroke abutment for the seating plate in relation to the spacing of the end abutments for the tongues, the elastic deformation occuring through the stroke can be distributed selectively between the flexible guide rods and the elastic tongues. With similar deformation of the guide rods a greater stroke in relation to the known closure plate with lamellae adhering together at both ends is possible in the region of the free ends of the tongues, so that a larger throughflow cross-section is obtained. With comparatively short and/or rigid elastic tongues, end abutments for the tongues can be dispensed with.

The flexible guide rods can be formed as U-shaped double guide rods and, preferably in the region of the junction of the two arms of the guide rod, a guide rod abutment can be provided at a smaller distance from the seating plate than the end abutments for the free ends of the elastic tongues. Accordingly, there is the possibility of distributing, as required in accordance with the valve requirements, over the separate sections of the flexible guide rods and over the elastic tongues the elastic deformations of the closure plate necessary for the opening of the valve.

The invention will now be described by way of example with reference to the accompanying drawings in which.

Figure 1:
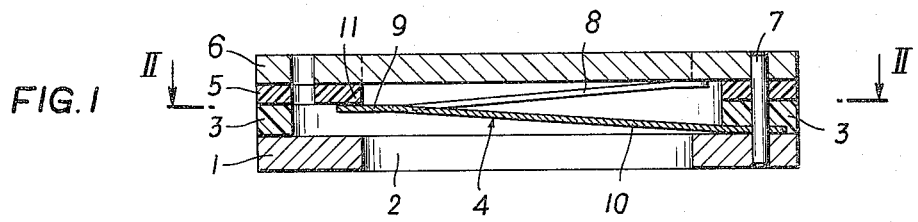
FIG. 1 is a section through one form of lamellar valve construction along the line I—I in FIG. 2.
Figure 2:
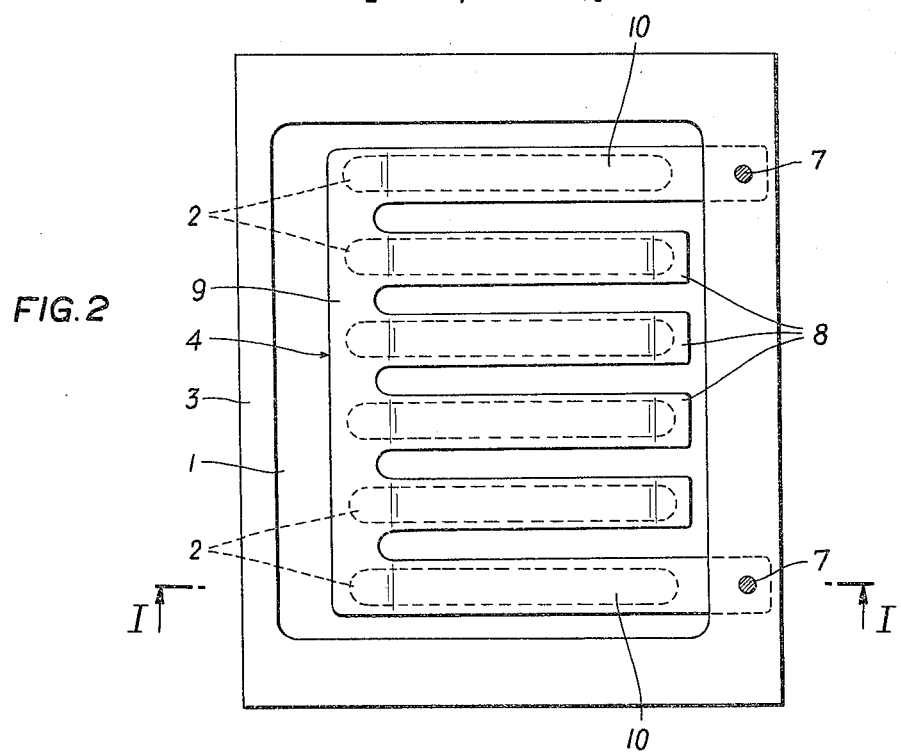
FIG. 2 is a section along line II—II in FIG. 1.

The lamellar valve according to FIGS. 1 and 2 has a rectangular seating plate 1 with throughflow channels 2 which are covered by a closure plate 4 clamped firmly on the seating plate 1 by means of a disc 3 of sealing material. Over the disc 3 lies a further disc 5 which can also consist of sealing material. A catcher plate 6 with throughflow slits forms a closure, the slits being in a laterally staggered configuration in relation to the throughflow channels 2 in the seating plate 1. The individual plates and discs are centered by two pins 7. The thus assembled valve can be clamped between a cylinder and cylinder head, or by means of its own valve cover can be fixed to the cylinder of a compressor. The valve is however also suitable for other usages, for instance for installation in a pipeline as a check valve.

The closure plate 4 consists (see FIG. 2) of elastic tongues 8 each having a free end and which at their other ends are attached together by means of a transversely disposed joining web 9. Flexible guide rods 10 are connected to the web, the free ends of the guide rods being centered by the pins 7 and fixedly clamped on the seating plate 1 by means of the disc 3. The tongues 8 and the guide rods 10 cover the throughflow channels 2 in the seating plate 1.

FIG. 1 shows the valve in the open position, with the closure plate 4 lifted away from the seating plate 1. The free ends of the tongues 8 rest on the catcher plate 6, whereas for the joining web 9 its own stroke-limiting abutment 11 is provided, this being formed, in the example shown, by the upper disc 5. The same purpose would be served by a projection of the catcher plate 6 or an offset construction of the same. The joining web 9 accordingly stops at a smaller distance from the seating plate 1 and executes a smaller stroke than the free ends of the tongues 8 of the closure plate 4. The height of the abutment 11 and its spacing from the seating plate 1 can be selected as desired to conform to the requirements of the valve. The abutment 11 can also be omitted so that the joining web 9 executes the complete stroke of the tongues and strikes directly on the catcher plate 6. By virtue of the separation of the closure plate 4 into freely movable tongues 8, either with the same mechanical stressing of the closure plate 4 it is possible to have a larger stroke, or the stressing, with the same stroke, can be reduced. Moreover, with the increased elasticity of the closure plate 4 a smooth working of the valve with dampened impact on the catcher plate 6 and also on the seating plate 1 can be achieved.

Figure 3:
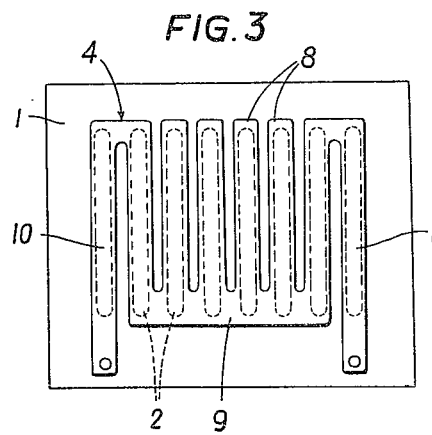
FIGS. 3 and 4 are plan views of two further forms of lamellar valve construction.
Figure 4:
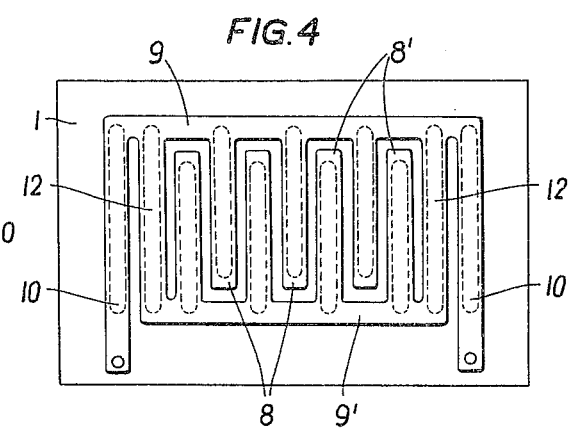

FIGS. 3 and 4 show two alternative constructions for the closure plate 4. According to FIG. 3 the guide rods 10 are of U-shaped construction, or so-called double guide rods, whereby they can bridge over a larger stroke. The central part of the closure plate consists again of elastic tongues 8 which are joined together by a transverse joining web 9. When using this closure plate, in place of the stroke abutment 11 for the joining web 9 or in addition to that construction, individual guide rod abutments for the U-shaped guide rods 10 can be provided, spaced at a smaller distance from the seating plate than the end abutments for the free ends of the tongues 8. The tongues 8 and also the two arms of the U-shaped guide rods 10 cover throughflow channels 2 of the seating plate, as indicated in FIG. 3.

The closure plate 4 according to FIG. 4 has elastic tongues 8 the free ends of which project alternately in opposite directions. The tongues 8 projecting in one direction are held together by a joining web 9 and the oppositely directed tongues 8' extend from a second joining web 9' which is connected by longitudinal webs 12 to the joining web 9. Again in this example the throughflow channels 2 of the seating plate 1 are covered by the tongues 8, 8' and the flexible guide rods 10 as well as longitudinal webs 12 provided between the joining webs 9, 9'. Stroke abutments can be provided for the two joining webs 9, 9' having a different spacing from the seating plate 1.

We claim:

1. A lamellar valve for compressors, comprising: a seating plate with throughflow channels; a closure plate supported by flexible guide rods for covering said throughflow channels and including elastic tongues with free ends, said tongues being connected by a transverse joining web; and said flexible guide rods extending from the ends of said joining web and being clamped at locations spaced therefrom.

2. The lamellar valve of claim 1, further comprising an abutment for limiting the stroke of said joining web to be less than the stroke of said free ends of said elastic tongues.

3. The lamellar valve of claim 1, wherein said flexible guide rods are in the form of U-shaped double guide rods.

4. The lamellar valve of claim 3 further comprising guide rod abutments for limiting the stroke of said flexible guide rods to be less than the stroke of said free ends of said elastic tongues, said guide rod abutments being located to engage said U-shaped double guide rods at the junctions between the two arms thereof.

* * * * *